Patented Jan. 1, 1935

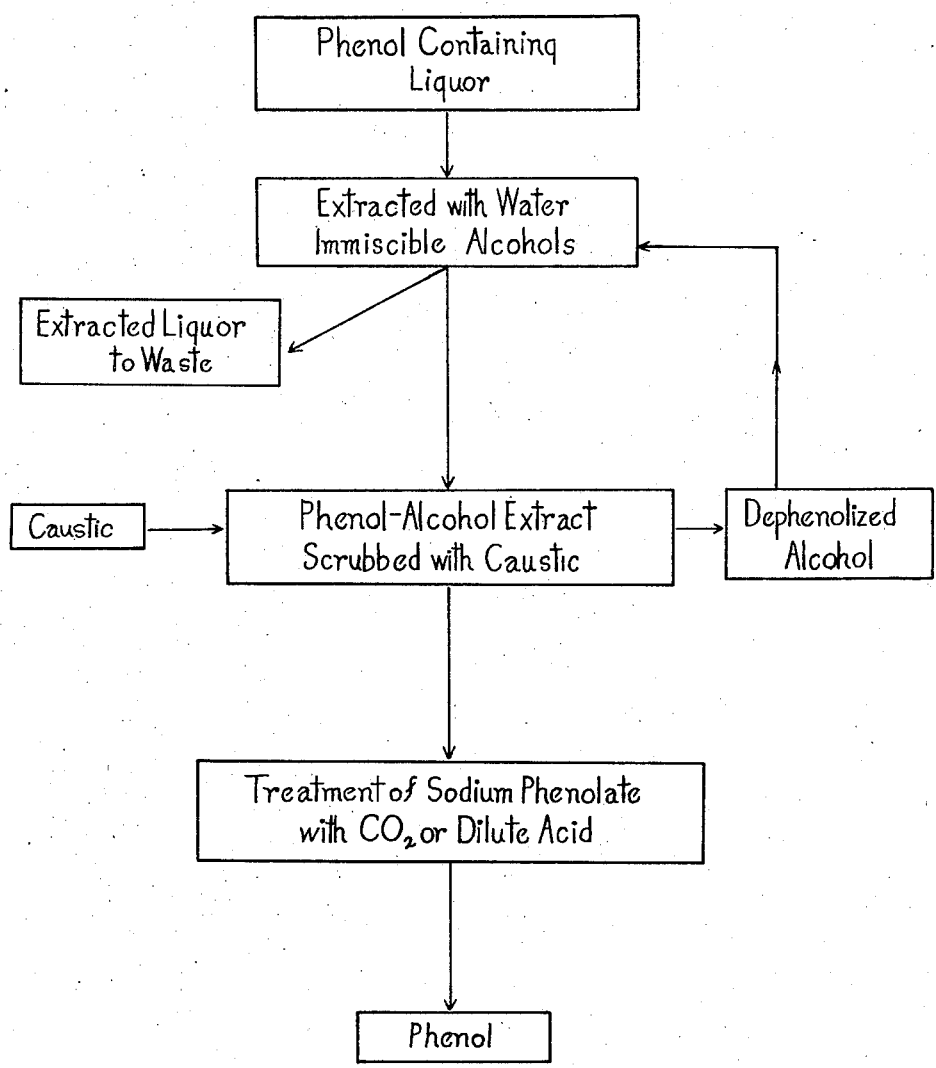

1,986,320

UNITED STATES PATENT OFFICE 1,986,320

PHENOL RECOVERY PROCESS

Charles L. Burdick, Wilmington, Del., assignor to E. I. du Pont de Nemours & Company, Wilmington, Del., a corporation of Delaware Application December 11, 1931, Serial No. 580,281

9 Claims. (Cl. 260—154)

This invention relates to a process for the recovery of phenols from solution and more particularly to a process for the recovery of phenols by extraction from gas liquor by means of water insoluble alcohols.

The by-product coke industry, at the present time, is confronted with a most difficult problem as respects disposal of the liquor produced in the recovery of ammonia from such processes. This liquor is variously called gas liquor, ammonia liquor, etc. Many producers in the industry would like to run this effluent to waste and altho the ammonia it contains is quite harmless,—its phenol content, on the other hand, is often in sufficient concentration to give considerable trouble when discharged into the neighboring streams. The public health and game conservation authorities generally raise objection to disposing of it, in this manner, due to the toxic effect and the unpleasant taste imparted by the phenols to the water.

It would, therefore, be of considerable advantage to this industry to be provided with a simple and inexpensive process which would enable the coke oven operator to eliminate phenols from the gas liquor. He would then be free to discharge this liquor into the neighboring streams without hindrance from the authorities or encroachment upon the riparian rights of others.

An object of the present invention is to provide a process for the recovery of phenols, cresol, and like tar acids from gas liquor, ammonia liquor, etc. Another object of the invention is to provide a process for the recovery of phenols from gas liquor by extraction with a water immiscible alcohol. A further object of the invention is to provide a process for the extraction of aqueous phenol-bearing solutions by means of a mixture of water immiscible oxygenated organic compounds obtained by the hydrogenation of carbon oxides under elevated pressure. Other objects and advantages of the invention will be more readily understood from the following specification.

I have found that phenols, cresol, and like compounds having similar solubility characteristics, may be extracted from solutions and more particularly from ammonia and phenol-containing gas liquor by extraction with a water immiscible alcohol, such, for example, as butyl alcohol, amyl alcohol, hexyl alcohol, etc. A mixture of these water immiscible alcohols may likewise be employed and I prefer to employ more particularly the water immiscible fractions of the oxygenated organic compounds, comprising essentially alcohols, which are obtained by the catalytic hydrogenation of carbon oxides under elevated pressure as described, for example, in Roger Williams U. S. Patent No. 1,820,417,—the fractions boiling in the range of 130 to 210° C. being especially efficient.

It is common to treat phenol-bearing liquors with benzol, which is immiscible therewith and which extracts the phenol. This extraction is usually practiced on the undistilled ammoniacal liquors. The phenol is then removed from the benzol, by treatment with a caustic soda solution, thus forming sodium phenolate, and the phenol is subsequently separated by acidification, or treatment with carbon dioxide. The extraction of phenol-bearing liquids with water immiscible alcohols, and more particularly their extraction with my preferred mixture of water immiscible alcohols, is carried out in much the same manner as the extraction of phenol with benzol.

A general method, which is susceptible of many modifications, is as follows: A flow sheet for this general method accompanies this specification, and, by reference to it, the steps of my process may be more readily and clearly understood. The liquor, containing phenols, such as that obtained in the treatment of liquors produced in the recovery of ammonia from coal gas, is extracted with one or more water immiscible alcohols. The water immiscible alcohol is preferably introduced in a finely divided state into the liquid. The alcohols in this form may be forced into the bottom of a packed column, which is filled with the alcohol and liquor, down which the ammoniacal liquor is flowing. Any other suitable type of extracting apparatus may, of course, be used. The alcohols being of a lighter specific gravity than the liquor bubble up thru it and in doing so efficiently extract the phenol from the liquor. From the top of the tower the phenol-charged-alcohol is withdrawn, while from the bottom the liquor which is now substantially free from phenol is passed to waste. The alcohol-phenol mixture is now scrubbed with an aqueous caustic soda or similar alkaline solution which converts the phenol present to sodium phenolate. From the scrubbing operation, the alcohols, free from the phenols, are returned to the extraction operation. The aqueous caustic soda and sodium phenolate solution is treated with dilute acid or preferably carbon dioxide which decomposes the sodium phenolate it contains and allows the phenol to form a separate layer.

An alternate method of effecting the extraction may be carried out in accord with the following process. In lieu of introducing the alcohols into a packed column as described above, they may be sprayed into a tank containing the alcohol mixture. The tank, if desired, may be one of a series. The liquors, discharged from the bottom of the first tank, are sprayed into a second tank containing the alcohol mixture, less saturated with the phenols extracted than the first mixture. To obtain substantially complete extraction additional stages may be used. When the alcohols in the first stage have reached substantial saturation, they are discharged and the phenol-alcohol extract treated as described above for the recovery of the phenol and purification of the alcohols. The first stage is then recharged with the dephenolized alcohol mixture and used as the last extraction stage from the bottom of which the extracted liquor is passed to waste.

The extracting and scrubbing operations may be conducted to advantage by forcing the alcohols or liquor and caustic, in their respective operations, thru a porous medium, such as the well known Filtros blocks or plates, alundum plates, fabric diffuses, or the like, thru which the materials are introduced, in a minute state of subdivision, into the liquid being treated. Such treatment greatly increases the efficiency of the respective extracting and scrubbing operations. A similar type of apparatus may also be employed, if desired, for the treatment of the aqueous sodium phenolate solution with either carbon dioxide or dilute acid.

While the individual water immiscible alcohols, such as those specifically designated above, are well suited for extracting phenol-bearing liquors, I prefer a mixture of these alcohols such as is obtained by the catalytic hydrogenation of carbon oxides under pressure. Accordingly, in preparing my preferred alcohol mixture I subject the mixture of oxygenated organic compounds obtained in high pressure catalytic hydrogenation of carbon oxides, to fractional distillation, collecting separately the lower water miscible alcohols and the higher water immiscible alcohols boiling in the range of 130–210° C. which contain the fractions I prefer as phenol extractants. While the whole fraction boiling in the range of 130–210° C. may generally be used, other cuts, e. g. 130–140, 140–160, 160–210, etc., may be found more suitable for particular applications.

In order that the exceptional advantage of my preferred alcohol extracting medium may be more fully appreciated, its ability to extract phenol from liquors has been compared with the ability of benzol under identical conditions. An ammoniacal liquor containing 6.3 grams of phenol per liter was extracted with this alcohol mixture. The alcohol prior to the extraction contained no phenol. After extraction the ammoniacal liquor contained approximately 0.66 grams of phenol per liter, while the alcohol contained 5.6 grams of phenol per liter. These are average values obtained from several runs. In the comparative runs with benzol the ammoniacal liquor after extraction contained approximately an average of 3.5 grams of phenol per liter while the benzol contained an average of 2.8 grams of phenol per liter. The benzol, initially, contained no phenol. disregarding the possibility of association of the phenol in either extracting medium, it has been found that the best average values of the partition coefficient are about 4 for benzol and 40 for the alcohols. The exceptional advantage, therefore, in favor of the alcohols is apparent.

From a consideration of the above specification it will be realized that any modification of my method of treating aqueous phenol-bearing liquors with water immiscible alcohols, and more particularly with my preferred mixture of water immiscible alcohols, will come within the scope of this invention without sacrificing any of the advantages that may be derived therefrom.

I claim:

1. In a process of treating a phenol-bearing liquor for extraction of phenol therefrom, the step which comprises treating the liquor with a mixture of water immiscible phenol-absorbing oxygenated organic compounds obtained from the catalytic hydrogenation of carbon oxides under elevated temperatures and pressures.

2. In a process of treating a phenol-bearing liquor for extraction of phenol therefrom, the step which comprises treating the liquor with a mixture of the synthetic aliphatic alcohols boiling within the range of approximately 130–210° C. obtained by the hydrogenation of carbon oxides under elevated pressure.

3. In a process of extracting phenol from a phenol-bearing liquor, the step which comprises subjecting the liquor to extraction with a synthetic aliphatic alcohol fraction boiling within the range of approximately 130–210° C. obtained by the hydrogenation of carbon oxides under elevated pressure.

4. In a process of extracting phenol from a phenol-bearing liquor, the step which comprises subjecting the liquor to extraction with a mixture of water immiscible synthetic aliphatic alcohols obtained from the catalytic hydrogenation of carbon oxides under elevated pressure.

5. In a process of extracting phenol from a phenol-bearing liquor, the step which comprises subjecting the liquor to extraction with an extractant containing a plurality of compounds obtained from a mixture of oxygenated organic compounds, having the boiling range of from approximately 130–210° C., obtained by the hydrogenation of carbon oxides under elevated pressure.

6. In the treatment of gas liquor to remove phenol therefrom, the step which comprises treating the liquor with a mixture of synthetic aliphatic alcohols boiling within the range of approximately 130–210° C., obtained by the hydrogenation of carbon oxides under elevated pressure, the alcohols being supplied to the liquor in a finely divided state.

7. The process for the removal of phenols from gas liquor which comprises subjecting the gas liquor to treatment with a mixture of synthetic aliphatic alcohols boiling within the range of approximately 130–210° C., obtained by the hydrogenation of carbon oxides under elevated pressure, scrubbing the alcohol-extract therefrom with caustic alkali, to convert the phenols it contains to sodium phenolate, and subsequently reconverting the sodium phenolate to phenol.

8. The process of removing phenol from gas liquor which comprises extracting the gas liquor by means of a mixture of synthetic aliphatic alcohols boiling within the range of approximately 130–210° C. obtained by the hydrogenation of carbon oxides under elevated pressure, the extraction being conducted by passing the alcohols countercurrent to the flow of the gas liquor, scrubbing the alcohol-extract with caustic soda, returning the alcohols separated during the scrubbing operation to the extracting operation, treating the aqueous sodium phenolate solution, formed during the scrubbing operation, with carbon dioxide whereby the sodium phenolate is reconverted to phenol, and subsequently separating the phenol.

9. The process of treating aqueous phenol-bearing liquor which comprises separating the phenol therefrom by extracting with a mixture of oxygenated organic compounds boiling within the range of approximately 130-210° C. obtained by the hydrogenation of carbon oxides under elevated pressure.

CHARLES L. BURDICK.